Dec. 24, 1963    M. J. BEBECH    3,115,458
APPARATUS FOR FILTERING LIQUIDS
Filed May 11, 1960    2 Sheets-Sheet 1

INVENTOR.
MICHAEL J. BEBECH
BY Oldham & Oldham
ATTYS.

Dec. 24, 1963    M. J. BEBECH    3,115,458
APPARATUS FOR FILTERING LIQUIDS
Filed May 11, 1960    2 Sheets-Sheet 2

*INVENTOR.*
MICHAEL J. BEBECH
BY
*Oldham & Oldham*
ATTYS.

United States Patent Office 3,115,458
Patented Dec. 24, 1963

3,115,458
APPARATUS FOR FILTERING LIQUIDS
Michael J. Bebech, R.D. 1, Box 73, Bedford Road,
Masury, Ohio
Filed May 11, 1960, Ser. No. 28,284
3 Claims. (Cl. 210—241)

This invention relates to apparatus for filtering liquids, and, more particularly, is concerned with apparatus for purifying dry cleaning liquids, wine, medicines, and various other materials. It is the general object of the present invention to provide liquid filtering apparatus characterized by fully automatic or semi-automatic operation, by compactness of size, inexpensiveness of manufacture, and long and effective life, and wherein the material filtered out of the liquid is periodically removed from the apparatus in the form of a dry cake without interrupting the flow of the liquid to be filtered through the apparatus.

Another object of the invention is the provision of liquid filtering apparatus wherein fuller's earth or other diatomaceous earth is added to the liquid to be filtered, or some other form of activated carbon, usually in the form of a powder is added to the liquid to be filtered, the carbon or earth collecting on the filter screens of the apparatus together with the lint, dirt, and the like to be filtered from the liquid, with means being provided to shake this precoat from the filter screen down into the bottom of the apparatus, and with this precoat, sometimes called "muck" being pressed into substantially dry cakes or slugs and ejected from the bottom of the apparatus without interfering with the flow of the liquid to be filtered therethrough.

The foregoing objects of the invention, and other objects which will become apparent as the description proceeds, are achieved by the provision of apparatus for filtering liquids including a closed chamber, a closed reservoir inside the chamber and mounted for vertical movement therein, a plurality of tubular filter screens supported on the reservoir and having their insides connected to the reservoir, shoulder means limiting the vertical movement of the reservoir in the chamber, means extending in fluid-tight relation through the chamber wall for moving the reservoir and filter means up and down and for bumping the reservoir against the shoulder means, a flexible conduit extending from the reservoir out of the top of the chamber for conducting liquid from the reservoir, a conduit connected to the chamber near its bottom for conducting liquid to the chamber, the bottom of the chamber being slanted and terminating in a muck receiving cylinder, a fluid pressure motor having a piston rod in alignment with the muck receiving cylinder and above it, a packer head secured to the piston rod and movable thereby into the muck receiving cylinder to pack therein any material falling off the filter screens, a substantially rectangular ram guide intersecting the lower end of the cylinder, a ram slidable in the ram guide, a fluid pressure motor for reciprocating the ram, a door slidably closing the end of the ram guide remote from the ram operating fluid motor, a fluid pressure motor for opening and closing the door, the door being spaced from the cylinder and with the stroke of the ram terminating at the edge of the cylinder so that a slug of muck seals between the cylinder and door at all times, and a muck remover basket for receiving a slug of muck pushed through the door.

For a better understanding of the invention reference should be had to the drawings wherein FIG. 1 is an end view of apparatus constructed in accord with the principles of the invention;

Figure 2:
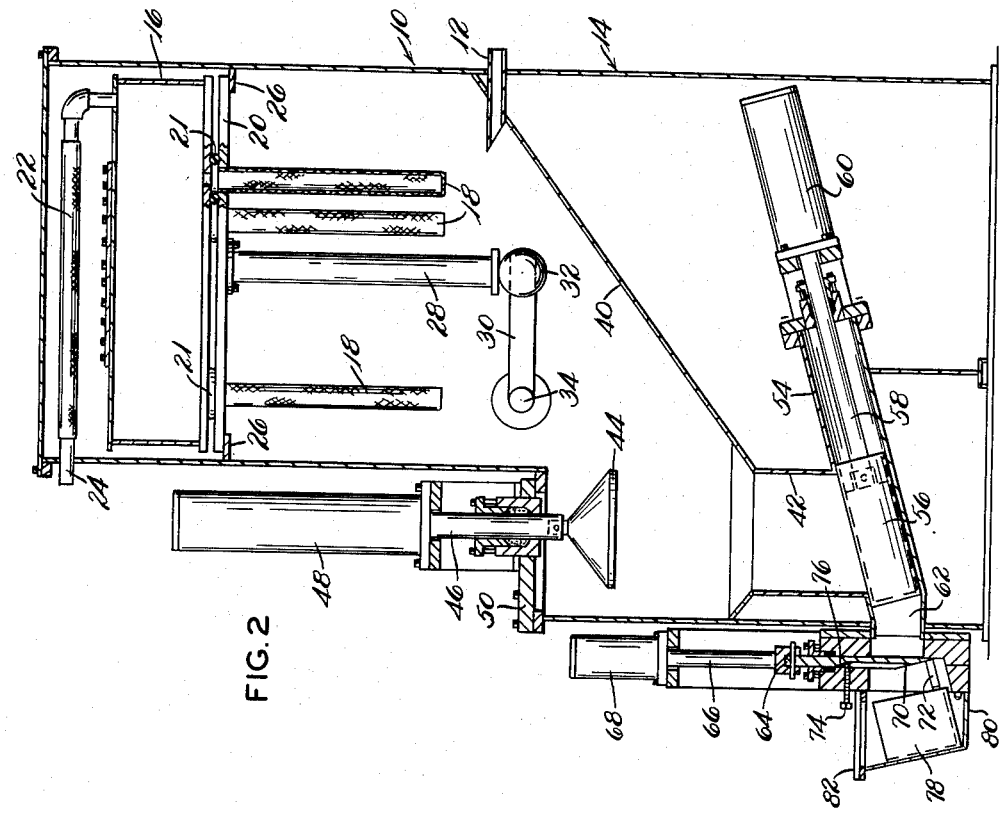
FIG. 2 is a vertical cross-sectional view taken substantially on line 2—2 of FIG. 1.
Figure 1:
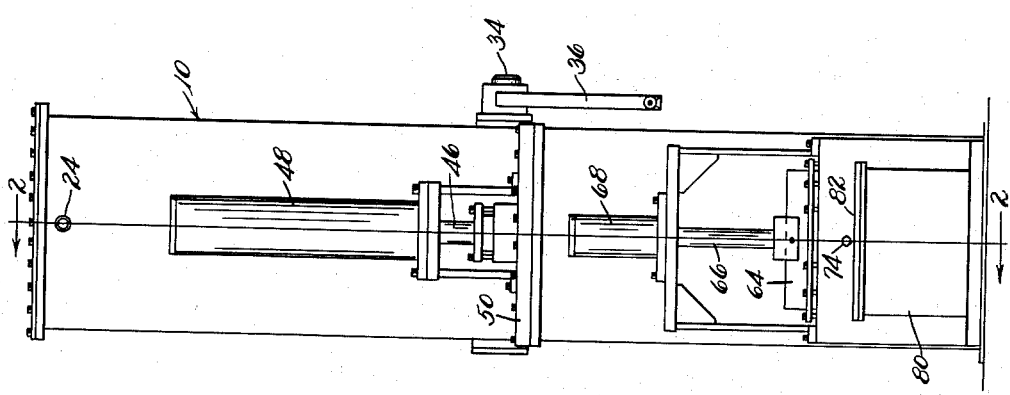
Figure 3:
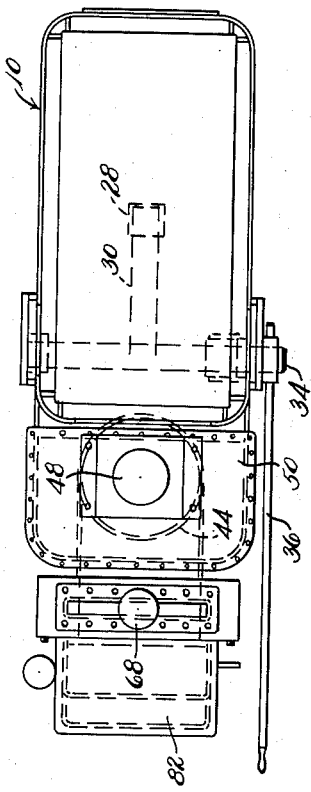
FIG. 3 is a plan view of the apparatus of FIG. 1.

In the drawings, the numeral 10 indicates generally a chamber adapted to receive by way of an inlet pipe 12 the liquid to be filtered, the chamber 10 being carried upon a base 14. Positioned in the chamber 20 for limited vertical movement therein is a closed reservoir 16 to the bottom of which are secured a plurality of tubes 18 of filter screens. For purposes of simplification, not all of the tubes 18 are shown. Instead of securing the filter screens 18 directly to the bottom of the reservoir 16, the filter screen tubes 18 may more conveniently be mounted upon a filter plate 20 with interposed gaskets 21 between the filter plate and the bottom of the reservoir 16 so that the inside of each filter screen 18 is connected to the inside of the reservoir 16 to pass any liquid filtered by the screen into the reservoir. The top of the reservoir 16 is connected by a flexible hose 22 to an outlet pipe 24 for discharging the filtered liquid from the apparatus.

The lower edge of the reservoir 16, or the lower edge of the filter plate 20 if this is used, rests upon a flange 26 limiting the downward movement of the reservoir 16 and plate 20, and a central post 28 secured to the filter plate 20 extends down below the lower ends of the filter screens 18 so that the lower end of the post 28 can be bumped or engaged to raise and lower the reservoir 16 and filter plate 20 to and from the flange 26. For this purpose an arm 30 carries at its end a ball 32 for engaging with the bottom end of the central post 28, with the arm 30 being secured to a shaft 34 extending transversely through the chamber 10 in fluid-tight relation therewith, but having bearing support on the chamber, and with the shaft 34 having a long handle 36 secured thereto for manual or automatic operation at periodic times to bump the filter plate and reservoir 16 against the support flange 26 to knock any precoat materials off the filter screens 18. The precoat mateiral so dislodged falls down through the liquid in the chamber 10 and against the inclined bottom 40 of the chamber.

Inclined bottom 40 of the chamber 10 terminates in a vertically extending muck compartment or cylinder 42 which slidably receives a muck packer head 44 in vertical alignment with the cylinder 42. The muck packer head 44 is mounted upon the piston rod 46 of a fluid pressure motor 48 carried upon an offset shoulder 50 to one side of the chamber 10, all in fluid-tight relation. The precoat material of "muck" falling by gravity into the muck cylinder 42 in the manner previously described is now periodically compressed into the cylinder 42 by the operation of the fluid pressure motor 48 to move the muck packer head 44 down into the cylinder 42 to compress the muck in the cylinder under very considerable pressure. Any liquid in the muck tends to be displaced out of the muck by the greater specific gravity thereof, and is further squeezed out of the muck by the pressure of the packer head 44 which makes a slightly sloppy fit with the muck cylinder 42.

Intersecting the bottom of the muck cylinder 42 is a ram guide 54 slidably receiving a ram 56 connected to a piston rod 58 operated by a fluid pressure motor 60 mounted in the base 14 of the apparatus. The ram guide 54 and the ram 56 are substantially rectangular in cross section, and the ram 56 is normally retracted towards its fluid pressure motor 60 during the time that the muck is compressed in the muck cylinder 42 by the packer head 44. Thus, as the muck is packed down into the cylinder 42 it likewise fills the discharge passage or end 62 of the ram guide remote from the pressure motor 60, the passage 62 being closed by a vertically slidable door 64 connected to a piston rod 66 of a fluid pressure motor 68 for raising and lowering the door to open and close the outlet of passage 62. The lower edge of the door 64 may be tapered, as at 70 and may be adapted to engage with a wedge block 72, and with adjustable screws 74 engaging with tapered surfaces 76 on the upper edge of the door so that when the door is closed it is wedged very tightly towards the passage 62 to fully seal the end of the passage.

A muck remover basket 78 is held in a housing 80 outside of the vertically slidable door 64 to receive any cake or slug of muck pushed out from the bottom of the muck cylinder 42 by the ram 56 when the door 64 is opened. A clean-out door 82 at the top of the housing 80 allows the removal of the muck basket 78.

Figure 4:
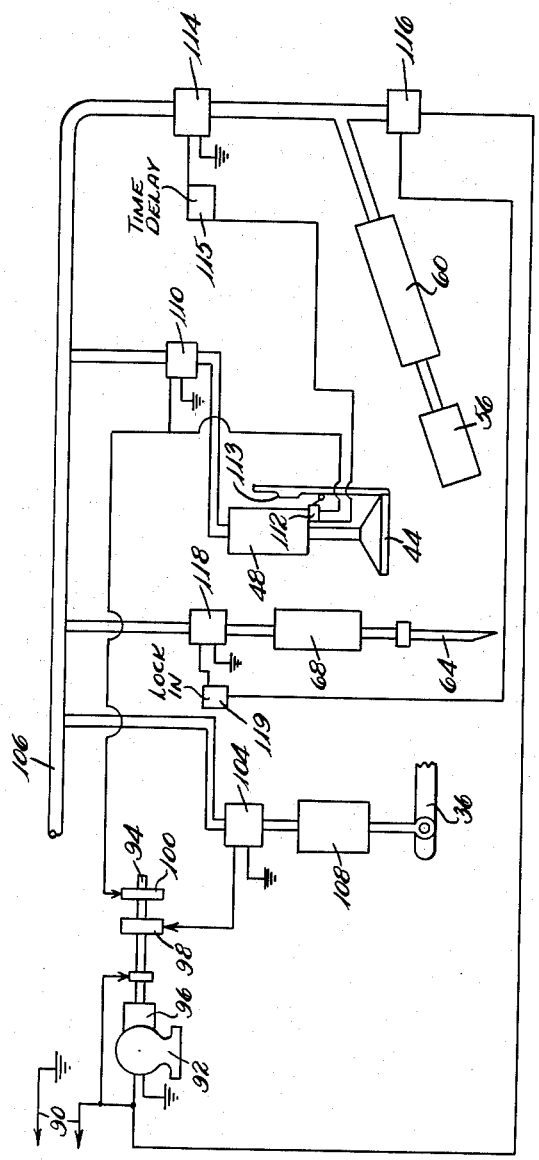
FIG. 4 is a schematic diagram of the electrical and fluid pressure control mechanism which can be incorporated with the apparatus.

Turning now to FIG. 4, the automatic sequence controls for the apparatus may take the form of an electric input 90 connected to a small electric motor 92 driving a control shaft 94 through a gear reducer 96, and with a plurality of control cams 98 and 100 being mounted on the shaft 94. The control cam 98 periodically electrically activates a solenoid valve 104 for controlling the supply of fluid pressure from an inlet line 106 to a fluid pressure motor 108 connected to the operating handle 36. In this manner at periodic intervals, for example every 15 minutes, the cylinder 108 is operated to lift the handle 36 to in turn lift the filter plate 20 and reservoir 16 and the filter tubes 18 upwardly away from the support flange 26 and to thereafter drop this entire unit back against the support flange 26 to thereby knock any precoat material or "muck" from the filter screen down to the sloping bottom 40 of the chamber 10 and into the muck cylinder 42.

Control cam 100 periodically electrically actuates a solenoid valve 110 to provide for flow of fluid pressure from input 106 to fluid pressure cylinder 48 for reciprocating the muck packer head 44 down into the muck cylinder 42 to compress the muck therein. The fluid pressure motor 48 may be activated, for example, every 30 minutes.

As much builds up in the muck cylinder 42 the downward stroke of the muck packer head 44 becomes gradually less, and with the muck cylinder 42 substantially full the stroke of the muck packer head 44 is so limited that a microswitch 112 is engaged for a sufficient period of time by a cam 113 carried on head 44 to close an electric circuit through time delay relay 115 to a solenoid valve 114 supplying fluid under pressure from the line 106 to the fluid pressure motor 60 operating the ram 56 with muck packer head 44 still down in muck cylinder 42. More particularly, if cam 113 passes quickly over switch 112, as during packing strokes on the muck, then solenoid valve 114 is not activated. It is only when cam 113 stops on switch 112 that time delay 115 functions to operate ram 56. This action occurs only when muck cylinder 42 is substantially full.

As the ram 56 builds up the pressure on the muck in the bottom of the muck cylinder 42 and in the discharge passage 62 to some relatively high pressure, for example 1,000 pounds per square inch, a pressure responsive switch 116 closes through lock-in relay 119 to energize solenoid valve 118 which connects fluid under pressure from input line 106 to fluid pressure motor 68 to open discharge door 64 to thereby allow a cake or slug of dry muck to be discharged into the muck remover basket 78. Once lock-in relay opens solenoid valve 118 this stays open, along with door 64, for say thirty seconds to allow a slug of muck to be discharged even though the pressure closing switch 116 falls off allowing the switch to open.

The entire cycle of operations now repeats itself, and the operation of the appartus is, as described, fully automatic over long periods of time substantially without attention or repair. The liquid being filtered continues to flow through the apparatus without interruption, and there is no need for back flushing.

Any or all of the operations described as being automatic can be performed manually by means of suitable push button controls should it be desired to make the apparatus manual rather than automatic in character.

It may sometimes be desirable to preplug the discharge passage 62 of the apparatus with clay or some other soft plastic prior to initiating the operation of the apparatus and so that there will be no opportunity for fluid leakage of the liquid filtered around the door 64. Once the machine is in operation the muck itself acts to seal, as will be understood, inasmuch as only part of the muck is removed upon any discharge. The passage 62 thus remains effectively sealed at all times.

While one best known embodiment of the apparatus has been illustrated and described in detail, it is to be particularly understood that the invention is not to be limited thereto or thereby, but that the scope is defined in the appended claims.

What is claimed is:

1. Apparatus for filtering liquids including a closed chamber, a closed reservoir inside the chamber and mounted for vertical movement therein, a plurality of rigid non-expansible tubular filter screens supported on the reservoir and having their insides connected to the reservoir, shoulder means limiting the vertical movement of the reservoir in the chamber, means extending in fluid-tight relation through the chamber wall for moving the reservoir and filter means up and down and for jolting the reservoir against the shoulder means, a flexible conduit extending from the reservoir out of the top of the chamber for conducting liquid from the reservoir, a conduit connected to the chamber near its bottom for conducting liquid to the chamber, the bottom of the chamber being slanted and terminating in a muck receiving cylinder, a fluid pressure motor having a piston rod in alignment with the muck receiving cylinder and above it, a packer head secured to the piston rod and movable thereby into the muck receiving cylinder to pack therein any material falling off the filter screens, a substantially rectangular ram guide intersecting the lower end of the cylinder, a ram slidable in the ram guide, a fluid pressure motor for reciprocating the ram, a door slidably closing the end of the ram guide remote from the ram operating fluid motor, a fluid pressure motor for opening and closing the door, the door being spaced from the cylinder and with the stroke of the ram terminating at the edge of the cylinder so that a slug of material seals between the cylinder and door at all times, and a material remover basket for receiving a slug of material pushed through the door.

2. Apparatus for filtering liquids including a closed chamber, a closed reservoir inside the chamber and mounted for vertical movement therein, a plurality of rigid non-expansible filter screens supported on the reservoir and having their insides connected to the reservoir, means for moving the reservoir and filter means up and down and for jolting the entire reservoir, a flexible conduit extending from the reservoir out of the top of the chamber for conducting liquid from the reservoir, a conduit connected to the chamber for conducting liquid to the chamber, the bottom of the chamber being slanted and terminating in a muck receiving cylinder, a fluid pressure motor having a piston rod in alignment with the muck receiving cylinder and above it, a packer head secured to the piston rod and movable thereby into the muck receiving cylinder to pack therein any material falling off the filter screens, a ram guide intersecting the lower end of the cylinder, a ram slidable in the ram guide, a fluid pressure motor for reciprocating the ram, a door closing the end of the ram guide remote from the ram operating fluid motor, means for opening and closing the door, and means for receiving a slug of material pushed through the door.

3. Apparatus for filtering liquids including a closed chamber, a closed reservoir inside the chamber and mounted for vertical movement therein, a plurality of filter screens supported on the reservoir and having their insides connected to the reservoir, means for moving the reservoir and filter means up and down and for jolting the reservoir, a flexible conduit extending from the reservoir out of the top of the chamber for conducting liquid from the reservoir, a conduit connected to the chamber for conducting liquid to the chamber, the bottom of the chamber being slanted and terminating in a muck receiving cylinder, a fluid pressure motor having a piston rod in alignment with the muck receiving cylinder and above it, a packer head secured to the piston rod and movable thereby into the muck receiving cylinder to pack therein any material falling off the filter screens, a ram guide intersecting the lower end of the cylinder, a ram slidable in the ram guide, a fluid pressure motor for reciprocating the ram, a door closing the end of the ram guide remote from the ram operating fluid motor, and means for opening and closing the door.

References Cited in the file of this patent

UNITED STATES PATENTS

| | | |
|---|---|---|
| 2,151,855 | Kobolt | Mar. 28, 1939 |
| 2,374,363 | McCaskell | Apr. 24, 1945 |
| 2,855,100 | Findlay | Oct. 7, 1958 |
| 2,901,115 | Schmidt et al. | Aug. 25, 1959 |
| 2,985,101 | Hillstrom | May 23, 1961 |
| 3,042,214 | Arvanitakis | July 3, 1962 |

FOREIGN PATENTS

| | | |
|---|---|---|
| 830,553 | Great Britain | Mar. 16, 1960 |